United States Patent
Apsit et al.

[11] 3,714,480
[45] Jan. 30, 1973

[54] HETEROPOLAR INDUCTOR GENERATOR

[75] Inventors: Voldemar Voldemarovich Apsit; Juris Leovich Kokle; Karl Ernestovich Skrutzitis; Mikhail Ivanovich Schukin, all of Riga, U.S.S.R.

[73] Assignee: Fiziko-Energetichesky Institut Akademii Nank Latviiskoi SSR, Riga, U.S.S.R.

[22] Filed: Dec. 23, 1971

[21] Appl. No.: 211,574

[52] U.S. Cl. ................................................310/170
[51] Int. Cl. ..........................................H02k 19/24
[58] Field of Search......310/168, 169, 170, 162–169, 310/201

[56] References Cited

UNITED STATES PATENTS

| | | |
|---|---|---|
| 2,253,966 | 8/1941 | Baumann ............................310/169 |
| 2,431,223 | 11/1947 | Ball .....................................310/169 |
| 2,609,412 | 9/1952 | Dreyfus ............................310/169 X |
| 3,469,135 | 9/1969 | Haviland et al. ......................310/170 |

FOREIGN PATENTS OR APPLICATIONS

| 756,495 | 9/1956 | Great Britain.........................310/168 |
|---|---|---|
| 769,140 | 2/1957 | Great Britain.........................310/168 |

*Primary Examiner*—D. F. Duggan
*Attorney*—Eric H. Waters et al.

[57] ABSTRACT

The induction machine of this invention comprises a stator with the slots thereof carrying a polyphase exciting winding and an armature winding; each phase of said armature winding consisting of at least two series-connected branches made up by separate coils; in each phase of the armature winding the coils of one branch are displaced relative to the similar coils of the other branch of an electric angle equal to the electric angle between the adjacent phases of the exciting windings encircling said branches.

1 Claim, 2 Drawing Figures

PATENTED JAN 30 1973 3,714,480

HETEROPOLAR INDUCTOR GENERATOR

Many branches of engineering, such as hydrolocation, special electric drive, electric automatic systems, etc., impose stringent requirements on the stability of generator output frequences, and also need variable frequency generators. One of the ways of developing such a generator is to employ an asynchronized synchronous variable exciting current frequency generator built around a asynchronous machine incorporating a phase-wound rotor and a brush assembly.

Known in the art are variable frequency generators built around a non-contact opposite-polarity induction machine having a polyphase exciting winding. There is a modification of such a machine which has a nonius (or interference) tooth belt (the number of teeth on the rotor and on the stator differ by 1) and a special distributed single-phase armature winding encircling the armature yoke.

This modification of the machine is too sophisticated in design and difficult in manufacture, moreover, no three-phase system can be obtained at the output of this modification.

Another known modification of a variable frequency induction machine with a polyphase exciting winding is built around a well-known design of an induction machine having two-tooth windings, i.e., such windings which encircle two pole shoes at once. This design is less sophisticated and easier to manufacture.

Nevertheless, this design does not allow of obtaining a three-phase system of voltage at the output either.

Most consumers and electrical devices, however, require a polyphase system of voltages with a variable or stabilized frequency.

It is an object of the present invention to eliminate these disadvantages.

It is a specific object of the present invention to provide a simple design of an induction machine with a polyphase exciting winding which will allow of varying the output frequency by varying the frequency of the current in the exciting winding for any number of output phases.

It is herein contemplated that there shall be provided an induction machine wherein, according to the invention, the coils of one branch in each phase of the armature winding are displaced relative to the similar coils of the other branch by an electric angle equal to the electric angle between the adjacent phases of the exciting winding encircling these branches.

The induction machine of the present invention may be employed as a single-phase or polyphase stabilized frequency generator, a variable frequency generator, a non-zero frequency angular speed transducer for a stationary machine, and in other devices. It can be also used without any modifications as an ordinary induction machine having its exciting windings supplied from a DC source.

One of the experimental embodiments of the invention has the following characteristics at a constant speed of rotation equal to 3,000 rpm:

| | |
|---|---|
| power rating | 25 km |
| number of armature winding phases | one |
| number of exciting winding phases | two |
| power factor (cos $\phi$) | 0.35 (capacitive) |
| exciting current frequency | 0–400 Hz |
| output frequency | 1,850–2,600 Hz |
| rotation emf frequency (d.c. exciting current) | 2,250 Hz |
| weight | 240 kg |

The present invention will be more fully understood from the description of the embodiments thereof taken in conjunction with the accompanying drawings, wherein.

Figure 1:
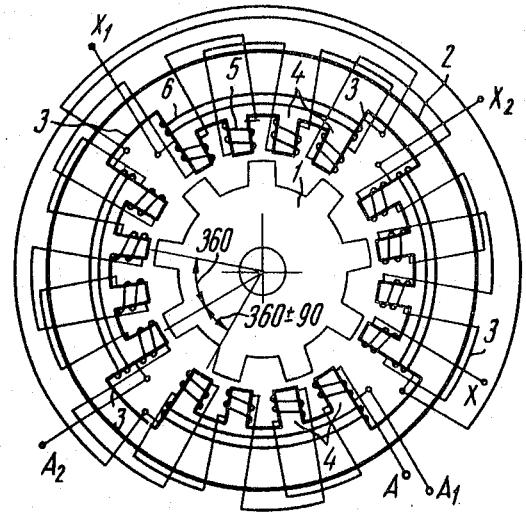
FIG. 1 is a representation of an induction machine having a single-phase armature winding and exciting windings connected to a two-phase source of supply.

An induction machine (FIG. 1) comprises a toothed rotor 1 and a stator 2 with four pole shoes 3 having stator teeth 4 alternating with slots. The tooth belt of each pole shoe 3 with armature winding coils 5 spanning their teeth 4 is constructed according to the principle embodied in a classic single-phase induction machine having the stator teeth spaced one-half of a rotor tooth pitch apart. Each of the shoes 3 has its own exciting coil 6. Two exciting coils 6 disposed about two diametrically opposite shoes 3 form a single exciting phase with an exciting winding $A_1-X_1$, and two other coils 6 form a second phase with a winding $A_2-X_2$, of a two-phase exciting system.

One of the distinguishing features of the induction machine as illustrated in FIG. 1 consists in that the space displacement between the adjacent the pole shoes 3, or, to be more precise, between the coil 5 of the armature winding of one shoe 3 and the similar coil 5 of the armature winding of the adjacent shoe, is equal to 90 electric degrees and corresponds exactly to the time phase shift of the two-phases exciting system employed herein.

Another feature consists in that the armature winding branch or group of coils 5 encircled by the exciting winding $A_1-X_1$ of the first phase must be connected in series with the armature winding group of coils 5 encircled by the exciting winding $A_2-X_2$ of the second phase.

Consider the principle of operation of the induction machine (FIG. 1) at no load.

If the exciting winding $A_1-X_1$ is supplied with alternating current sinusoidally varying in time at an angular frequency $\omega_1$ and with the permeance of the stator teeth 4 varying under the affect of rotation of the toothed rotor 1 at an angular frequency $\omega_2$, the linkage $\psi_1$ of the first coil group of the armature winding encircled by the exciting winding $A_1-X_1$ and the emf $E_1$ induces in some will vary in time in accordance with the expressions:

$$\Psi_1 = k \cdot \sin \omega_1 \cdot t \cdot \sin \omega_2 \cdot t = \frac{1}{2} k /\cos (\omega_1-\omega_2) \cdot t - \cos (\omega_1+\omega_2) \cdot t/;$$

$$E_1 = -\frac{\partial \Psi_1}{\partial t} = \frac{1}{2} k/(\omega_1-\omega_2) \cdot \sin (\omega_1-\omega_2) \cdot t - (\omega_1+\omega_2) \cdot \sin (\omega_1+\omega_2) \cdot t/.$$

In terms of physics, these expressions correspond to the well-known concept whereby the oscillations of a carrier frequency $\omega_2$, 100 percent amplitude modulated with a frequency $\omega_1$, may be represented as a superposition of two oscillations, each constant in amplitude, whose frequencies are equal to the sum and difference of the frequences $\omega_1$ and $\omega_2$.

The second exciting winding $A_2-X_2$ carries alternating current of the same value with an angular frequency $\omega_1$ of the second phase of a two-phase exciting system displaced in time by 90 electric degrees relative to the first phase. The expressions for the linkage $\Psi_2$ of the armature winding coil group encircled by the winding $A_2$–$X_2$, as well as for the amf $E_2$ induced in same, bearing in mind their 90 electric degree space displacement, for an earlier adopted time base, will be:

$$\Psi_2 = k \cdot \sin(\omega_1 \cdot t + 90°) \cdot \sin(\omega_2 \cdot t + 90°)$$
$$= \frac{1}{2} k/\cos(\omega_1 - \omega_2) \cdot t + \cos(\omega_1 + \omega_2) \cdot t/;$$
$$E_2 = -\frac{\partial \Psi_2}{\partial t} = \frac{1}{2} k/(\omega_1 - \omega_2) \cdot \sin(\omega_1 - \omega_2) + (\omega_1 + \omega_2) \cdot \sin(\omega_1 + \omega_2) \cdot t/.$$

With the two coil groups of the armature winding connected in series, the resultant emf at the A–X terminals will be:

$$E = E_1 \pm E_2 = k \cdot (\omega_1 \pm \omega_2) \cdot \sin(\omega_1 \pm \omega_2) \cdot t.$$

Here the sign ± is taken because the two groups may be series connected either in phase or in opposition.

It is clear, therefore, that the emf frequency of the armature winding A–X may be varied by varying the exciting current frequency.

Similar expressions can be obtained for a loading condition

Figure 2:
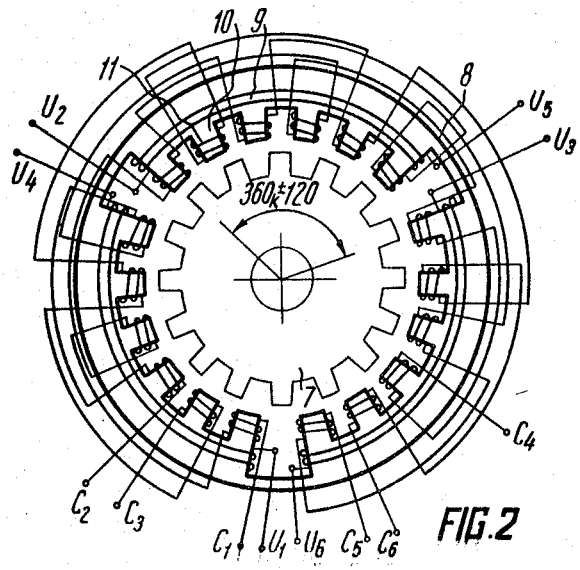
FIG. 2 is a representation of an induction machine having a three-phase armature winding and a three-phase exciting winding.

The induction machine illustrated in FIG. 2 comprises a toothed rotor 7 and a stator 8 with three pole shoes 9 having stator teeth 10 alternating with slots. The tooth belt of each pole shoe 9 having teeth 10 spanned by coils 11 of the armature winding is the same as in a three-phase induction machine. As indicated in FIG. 2 the teeth 10 of a pole shoe 9 are in particular electrically displaced relative to one another by 60 electric degrees, which permits forming about the pole shoe a symmetrical three-phase tooth belt with six teeth 10. Exciting coils $U_1$–$U_4$, $U_2$–$U_5$ and $U_3$–$U_6$ encircle one pole shoe 9 each and are connected to separate phases of the three-phase supply source of the exciting circuit.

This induction machine is distinguished by virtue of the fact that the space displacement of the coil 11 of the armature winding of one pole shoe relative to the analogous armature coil 11 of the armature winding of the adjacent pole shoe 9 is equal to 120 electric degrees and, hence, must correspond to the phase-time displacement of the three-phase exciting system employed herein.

Another feature of this embodiment consists in that the coils 11 of one and the same phase of the armature winding and disposed on different pole shoes 9 are connected in series with one another.

Thus, the coils 11 of the first phase form an armature winding $C_1$–$C_4$, the coils 11 of the second phase form an armature winding $C_2$–$C_5$, and the coils 11 of the third phase form an armature winding $C_3$–$C_6$, all the three armature windings being the output phases of a three-phase emf system.

Consider the induction machine of this embodiment operating at no load.

If the exciting coils $U_1$–$U_4$, $U_2$–$U_5$ and $U_3$–$U_6$ are supplied from separate phases of a three-phase supply source with an angular frequency $\omega_1$, and of the permeance of the air gap varies with an angular frequency $\omega_2$, the linkage $\psi_3$ of the armature winding $C_1$–$C_4$ is to be determined.

With the connection and displacement of the coils 11 of the armature winding on different pole shoes 9 and with the phase shift of the exciting currents (both displacements are equal to 120 electric degrees) the linkage $\psi_3$ of the armature winding $C_1$–$C_4$ will vary in time in accordance with the following law:

$$\psi_3 = k \cdot \sin \omega_1 t \cdot \sin \omega_2 t + k \cdot \sin(\omega_1 t + 120°) \cdot \sin(\omega_2 t + 120°) + k \cdot \sin(\omega_1 t + 240°) \cdot \sin(\omega_2 t + 240°) = 3/2 k \cdot \sin(\omega_1 - \omega_2) t.$$

The emf $E_3$ induced in the armature winding $C_1$–$C_4$ will accordingly equal $$E_3 = -\partial \psi_3 / \partial t = 3/2 k \cdot (\omega_1 - \omega_2) \cdot \sin(\omega_1 - \omega_2) \cdot t.$$

Similarly, the emf $E_4$ in the armature winding $C_2$–$C_4$ and the emf $E5$ in the armature winding $C_3$–$C_6$ of the induction machine will be:

$$E_4 = 3/2 k (\omega_1 - \omega_2) \cdot \sin/(\omega_1 - \omega_2) \cdot t + 120°/;$$

$$E_5 = 3/2 k (\omega_1 - \omega_2) \cdot \sin/(\omega_1 - \omega_2) \cdot t + 240°/.$$

Thus, there is provided in the armature winding $C_1$–$C_4$, $C_2$–$C_5$ and $C_3$–$C_6$ a three-phase system of emf $E_3$, $E_4$ and $E_5$ having a frequency equal to the difference between the exciting current angular frequency and the frequency due to the rotation of the toothed rotor 7 relative to the teeth 10 of the stator 8.

It is easy to demonstrate that if the exciting windings $U_1$–$U_4$, $U_2$–$U_5$ and $U_3$–$U_6$ are connected to a three-phase system with an inverse phase sequence (that is to say, the angle of displacement of currents in the exciting windings will be equal to minus 120°) with the direction of rotation of the rotor 7 unchanged, the emf $E_3$, $E_4$ and $E_5$ induced in the armature windings $C_1$–$C_4$, $C_2$–$C_5$ and $C_3$–$C_6$ will have their frequences in an additive relation.

Similarly to the above embodiments (FIGS. 1 and 2) of an induction machine, one can obtain the expressions for the emf of an induction machine for any other number of phases of the exciting winding (except for the single-phase case) and for any number of phases of the armature winding.

It will be noted in conclusion that the induction machine given in FIG. 1 is also applicable for a four-phase exciting system, provided each of the four exciting coils 6 has a lead connected to separate phases of a four-phase excitating supply system.

What is claimed is:

1. An induction machine comprising: a stator with slots; a polyphase exciting winding carried in the slots of said stator; an armature winding with each phase thereof comprising at least two series-connected branches made up by separate coils and disposed in the slots of said stator; in each phase of said armature winding the said coils of one branch being displaced relative to the similar said coils of the other branch by an electric angle equal to the electric angle between the adjacent phases of said exciting windings encircling said branches.

* * * * *